(12) United States Patent  
Kessler et al.

(10) Patent No.: US 10,097,057 B2  
(45) Date of Patent: Oct. 9, 2018

(54) ELECTRIC MOTOR, IN PARTICULAR OF A VEHICLE COMPONENT

(71) Applicant: BROSE FAHRZEUGTEILE GMBH & CO. KOMMANDITGESELLSCHAFT, WUERZBURG, Wuerzburg (DE)

(72) Inventors: Bernhard Kessler, Burkardroth (DE); Maximilian Knopf, Wuerzburg (DE); Christian Schumpa, Grosslangheim (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 504 days.

(21) Appl. No.: 14/769,880

(22) PCT Filed: Feb. 24, 2014

(86) PCT No.: PCT/EP2014/053494  
§ 371 (c)(1),  
(2) Date: Dec. 7, 2015

(87) PCT Pub. No.: WO2014/128287  
PCT Pub. Date: Aug. 28, 2014

(65) Prior Publication Data  
US 2016/0111929 A1    Apr. 21, 2016

(30) Foreign Application Priority Data

Feb. 22, 2013   (DE) .......................... 10 2013 003 024

(51) Int. Cl.  
*H02K 3/28*    (2006.01)  
*H02K 3/52*    (2006.01)  
(Continued)

(52) U.S. Cl.  
CPC ................. *H02K 3/28* (2013.01); *H02K 3/46* (2013.01); *H02K 3/522* (2013.01); *H02K 5/225* (2013.01); *H02K 2203/09* (2013.01)

(58) Field of Classification Search  
CPC ............ H02K 5/22; H02K 3/28; H02K 3/522; H02K 3/46; H02K 5/225  
(Continued)

(56) References Cited

U.S. PATENT DOCUMENTS 4,259,603 A * 3/1981 Uchiyama ............ H02K 1/2786  
310/156.21  
6,924,570 B2   8/2005 De Filippis et al.  
(Continued)

FOREIGN PATENT DOCUMENTS

CN    1720653 A    1/2006  
CN    1870388 A    11/2006  
(Continued)

*Primary Examiner* — Naishadh Desai  
(74) *Attorney, Agent, or Firm* — Laurence A. Greenberg; Werner H. Stemer; Ralph E. Locher

(57) ABSTRACT

An electric motor of a vehicle component, in particular a window opener drive or seat adjuster drive, includes a rotor, a stator with a three-phase stator winding having at least one coil per phase with first and second coil ends, and a connection element having a number of vias corresponding to the number of coil ends, the vias forming first and second contacting groups. The vias of the first contacting group are paired with a contact ring with contact points for electrically conductively connecting the first coil ends, in particular while forming a neutral point. The second coil ends are guided through the vias of the second contacting group, and a coil end portion or additional conductor element of the coil ends is azimuthally guided along the connection element and (Continued)

guided, preferably axially, out of the connection element while providing a three-phase winding connection at exposed positions.

18 Claims, 7 Drawing Sheets

(51) Int. Cl.
 *H02K 3/46* (2006.01)
 *H02K 5/22* (2006.01)
(58) Field of Classification Search
 USPC .................................. 310/179–210, 214, 215
 See application file for complete search history.

(56) References Cited

U.S. PATENT DOCUMENTS

| | | | |
|---|---|---|---|
| 7,402,925 | B2 | 7/2008 | Best et al. |
| 7,952,245 | B2 | 5/2011 | Ueda et al. |
| 8,339,001 | B2 * | 12/2012 | Ghodsi-Khameneh ..................... H02K 3/28 310/416 |
| 9,160,217 | B2 | 10/2015 | Nakagawa |
| 2005/0088049 | A1 | 4/2005 | De Filippis et al. |
| 2006/0091745 | A1 * | 5/2006 | Klappenbach ......... H02K 3/522 310/71 |
| 2006/0262442 | A1 | 11/2006 | Best et al. |
| 2008/0024030 | A1 * | 1/2008 | Saboi ..................... H02K 3/522 310/208 |
| 2008/0265701 | A1 * | 10/2008 | Ueda ...................... H02K 3/522 310/71 |
| 2011/0057524 | A1 | 3/2011 | Andrieux et al. |
| 2012/0319511 | A1 | 12/2012 | Kifer et al. |

FOREIGN PATENT DOCUMENTS

| | | |
|---|---|---|
| DE | 10261611 A1 | 7/2004 |
| DE | 10318816 A1 | 11/2004 |
| DE | 102007040809 A1 | 3/2009 |
| DE | 102009036128 A1 | 2/2011 |
| EP | 1526628 A1 | 4/2005 |
| EP | 1727261 A1 | 11/2006 |
| JP | 2002101596 A | 4/2002 |
| JP | 2003324887 A | 11/2003 |
| JP | 2004320986 A | 11/2004 |
| JP | 2007159192 A | 6/2007 |
| JP | 2008278555 A | 11/2008 |
| JP | 2009124927 A | 6/2009 |
| JP | 2011205875 A | 10/2011 |
| JP | 2012231632 A | 11/2012 |

\* cited by examiner

ELECTRIC MOTOR, IN PARTICULAR OF A VEHICLE COMPONENT

BACKGROUND OF THE INVENTION

Field of the Invention

The invention relates to an electric motor, in particular of a vehicle component, for example of a window opener or a seat adjuster drive, comprising a rotor and comprising a stator with a three-phase stator winding with at least one coil (coil winding) for each phase, and also comprising a connection element.

An electric motor comprising a stator having twelve stator windings is known from DE 10 2009 036 128 A1, said stator windings being connected partially in series and ultimately forming a star connection. A supporting element and a conductive track structure formed from four wires are provided for the connection, said wires being received by the supporting element in that the wires are clipped into said supporting element. The wires form a complete ring or partial ring portions, wherein such a wire forms the star connection as a complete ring in conjunction with the coil ends of the stator windings. The supporting element has axial guides for an axial guidance of the coil ends. An ultimate electrical connection between the coil ends and the respective wires is produced by soldering, welding or staking.

US 2011/0057524 A1 discloses an electric plug connector arrangement for a brushless electromagnetic motor. This comprises a three-phase stator winding having a number of windings per phase, which are connected either in parallel or in series. The plug connector arrangement comprises an annular wire guide element for receiving the ends of the windings and also a connecting receptacle in the form of three annular connecting rails, which each have a cable shoe as an end. In addition, the connecting rails have axially widened wire clamps for securing the electrical contact for the three phases through the slots in the wire guide element.

A stator for an electric motor with annular stator stack having a plurality of stator teeth is known from US 2005/0088049 A1. An annular connecting unit is mounted on an end side or end face of the stator. The annular connecting unit comprises deflection elements and also a supporting element, which is equipped with a receptacle and slots. A series of connecting rings insulated from one another are located in the receptacle and each comprise contact elements guided outwardly through the slots.

DE 10 2007 040 809 A1 discloses a three-phase motor comprising a plurality of phases of a stator having coils connected in parallel. The stator has annular contact rails for contacting the coils, which are in turn formed with groove-shaped contact holders as a structural unit. The contact holders are manufactured from plastic and are injection molded onto the coils.

BRIEF SUMMARY OF THE INVENTION

The object of the invention is to provide the simplest possible connection of the stator or phase windings of an electric motor, which connection can be produced with minimal outlay, i.e. with a minimized number of rails or contact rings or of additional process steps, such as soldering, welding or staking of wires and coil ends of the phase windings.

This object is achieved in accordance with the invention by an electric motor, comprising a rotor, a stator with a three-phase stator winding having at least one coil with first and second coil ends per phase, a connection element having a number of contact vias corresponding to the number of coil ends, the vias forming a first and a second contacting group, the contact vias of the first contacting group being assigned a contact ring with contact points for the electrically conductive connection of the first coil ends, in particular while forming a neutral point, and the second coil ends being guided through the contact vias of the second contacting group and azimuthally guided via a coil end portion along the connection element and guided, preferably axially, out from the connection element while providing a three-phase winding connection at exposed positions. Advantageous embodiments are specified in the dependent claims.

In accordance with the invention the electric motor of the type mentioned in the introduction has a connection element having a number of contact vias corresponding to the number of coil ends. The connection element is expediently ring-shaped or annular and is adapted suitably here to the diameter of the stator in such a way that it can be arranged on an end face of the stator and can be fixed there.

Each coil end is connected to the corresponding coil ends of the two other phases, preferably while forming a neutral point, by means of a contact ring, which is assigned to the connection element and expediently is laid therein.

For this purpose a first contacting group forms a first number of contact vias, each of which is assigned to a contact point of the contact ring, in particular while forming a neutral point for the electrically conductive connection of the first coil ends.

The respective other (second) coil end is wired so as to be guided out from the connection element in order to electrically contact a control electronics unit at an exposed point. For this purpose a second contacting group forms a second number of contact vias, via which the second coil ends are guided through. The second coil ends for this purpose form coil end portions that are azimuthally guided along the connection element, i.e. preferably extend over or in said connection element on the outer circumferential side. The coil end portions are guided, preferably axially, out from the connection element, while providing a three-phase winding connection at exposed positions. The connection element is preferably annular.

Alternatively, the contact vias of the second contacting group may be assigned separate conductor elements for the electrically conductive connection to the second coil ends. In this second variant the conductor elements each form a conductor portion between a connection end and a contact end, said conductor portion being azimuthally guided along the connection element. In order to provide the three-phase winding connection, the connection ends of the conductor elements are then guided out from the connection element at the exposed positions, in particular again axially. The preferably annular connection element in this second variant forms an adapter so to speak.

In both variants the connection element serves for the connection-secure contacting of the usually comparatively large number of coil ends of the stator winding with a three-phase connection of a control circuit or control electronics unit, wherein the connection element already contains the in-phase connection of the coils of the stator winding, preferably in a star connection.

The connection element can thus be manufactured as a separate component and, for particularly easily handled assembly, can be provided with the stator of the electric motor supporting the stator winding with additionally reliable and fail-safe contacting and connection of the coils of the stator winding. Contact that can be assembled or produced in a simple and reliable manner with an electronics unit supplied in particular by a vehicle on-board network and/or with a current or voltage source is thus given, wherein the three-phase connection ends already can be positioned optimally.

In an advantageous embodiment the winding connections are held at exposed points—in relation to the motor axis—in the axial direction of the connection element. For this purpose the connection element has a corresponding number of retaining elements, which hold or at least support the winding connections or the connection ends of the conductor or coil end portions at the exposed points, preferably axially oriented. The retaining elements, which are preferably formed integrally on the connection element, form the transition point so to speak between the conductor or coil end portion and the winding connections. A stable arrangement is thus created for the further assembly of the electric motor.

In accordance with an expedient development the connection element comprises an annular frame part, in which the contact ring is laid. The frame part suitably has a circumferential wall and a radial inner collar formed integrally thereon. The contact vias are preferably formed in a manner running axially in the frame collar, whereas the azimuthal grooves for the coil ends or conductor portions of the connection element are provided in the circumferential wall, preferably on the outer circumferential side. These portions are thus guided circumferentially in the connection element (guide ring) and can be held there in an electrically insulated manner.

The contact ring is preferably formed with contact points bent out in a loop-like manner, which are aligned with the contact vias of the first contacting group in order to receive and contact the first coil ends.

In accordance with a suitable embodiment of the connection element, radially arranged detent elements for securing the connection element to the stator are provided. For this purpose the detent elements are distributed over the circumference of the frame part and are suitably formed integrally on the inner circumference of the inner collar. In order to produce the latched connection to the connection element, stator-side winding frames having corresponding detent elements are assigned to the coils.

In accordance with an expedient development a cover element is provided, which can be fixed to the connection element, in particular can be latched thereto. In this way the azimuthally guided portions (wire portions) can be protected, for example against soiling, and instances of faulty contact in the motor housing can be avoided.

The cover element suitably has a number of guide elements, which preferably are raised in a dome-like manner or are hood-like, corresponding to the number of phases. The winding connections are guided axially out from the connection element, via these guide elements of the cover element, for contact with a control electronics unit, wherein the direction reference is again based on the motor axis. This provides the wiring portions (coil end portions or conductor portions), which serve as winding connections or are effective as such, with a high stability for contact with a control unit (electronics unit) or with a current or voltage source (vehicle battery or vehicle on-board network).

In accordance with a suitable embodiment the cover element has at least one detent element for latching with the connection element. The cover element may therefore be fixed to the connection element easily and securely.

Both the connection element and the cover element are advantageously annular, and are produced expediently from an insulating material. A reliable, simple and space-saving assembly is thus enabled on the one hand, and on the other hand the coil ends or conductor elements can be guided without further insulation in the connection element at the exposed points.

BRIEF DESCRIPTION OF THE SEVERAL VIEWS OF THE DRAWING

Exemplary embodiments of the invention will be explained in greater detail hereinafter on the basis of a drawing, in which.

Parts corresponding to one another are provided in all figures with the same reference signs.

DESCRIPTION OF THE INVENTION

Figure 1:
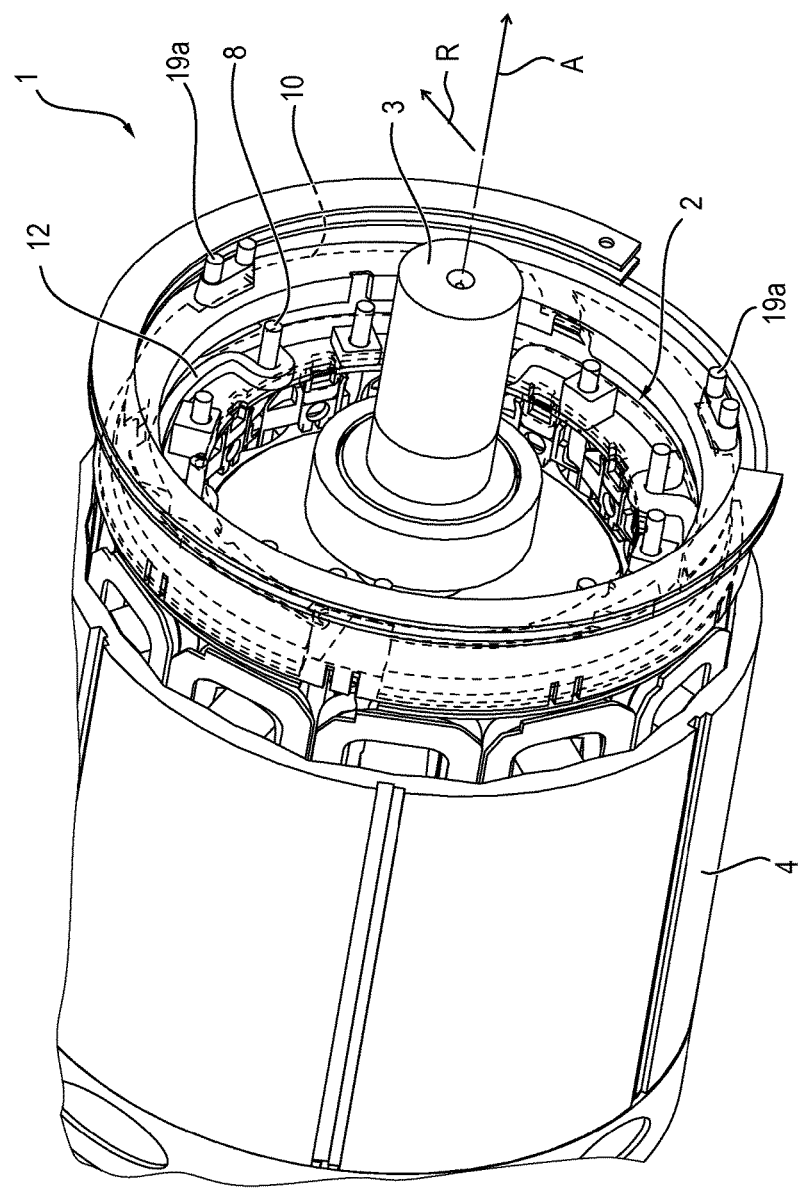
FIG. 1 shows a perspective illustration of an electric motor with stator and rotor.
Figure 2:
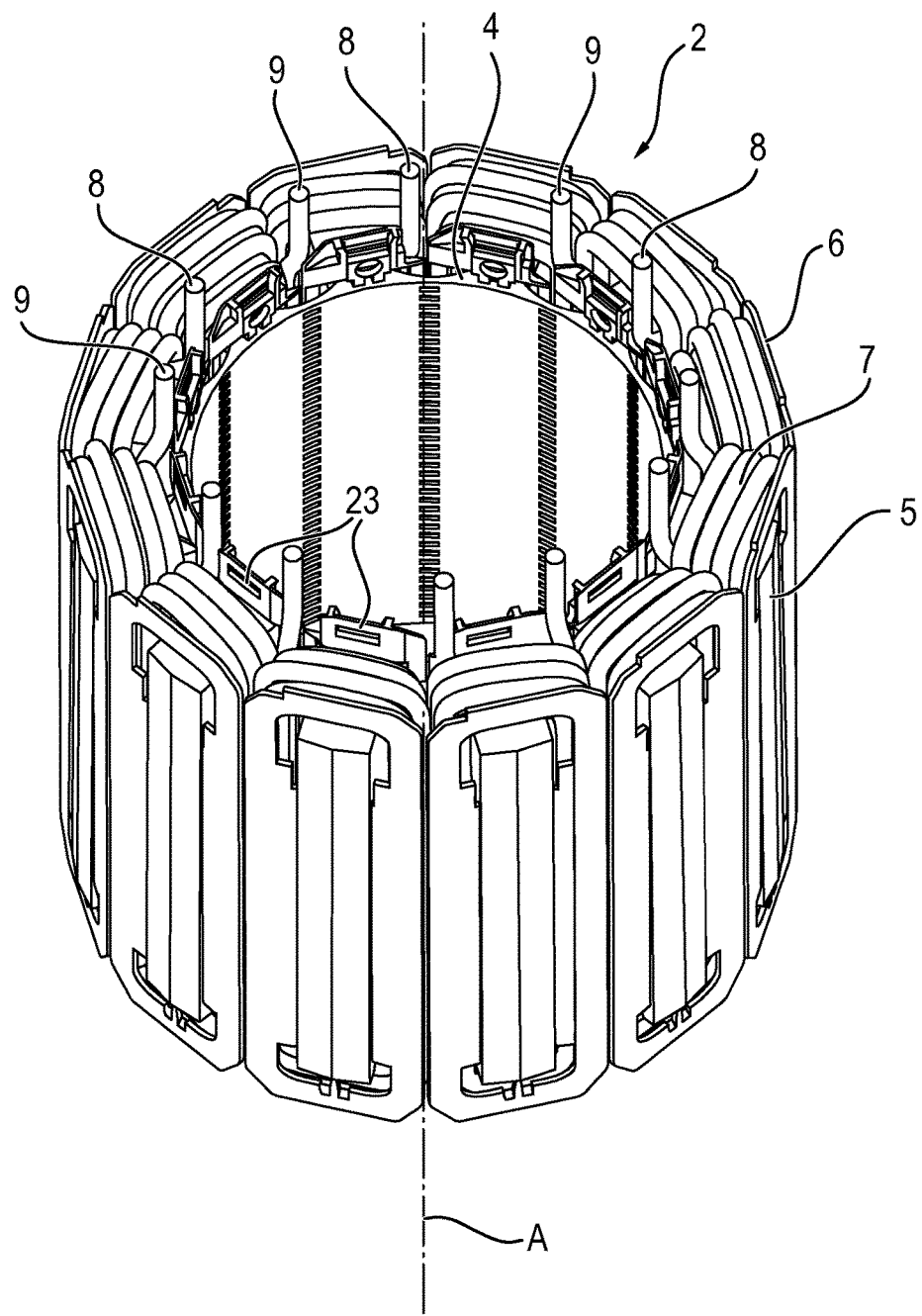
FIG. 2 shows a perspective illustration of a stator laminated core with wound winding or coil frames in (by way of example) six coil pairs, each having two coil ends.

FIG. 1 shows an electric motor 1 with a stator 2 and with a rotor 3 in a perspective illustration, whereas FIG. 2 shows part of the stator 2 of the electric motor 1 without yoke. The stator 2 cooperates in the usual manner with a rotor 3. The stator 2 is assigned a yoke 4 as laminated core, which is shown in FIG. 1 and is removed in FIG. 2, such that the star-shaped laminated core of the stator 2 can be seen there. The stator laminations stacked to form this core usually consist of soft-magnetic iron.

The stator 2, while forming stator grooves not designated in greater detail, has radially outwardly directed stator teeth 5, onto which frame-like winding carriers 6 are fitted. Each of the frame-like winding carriers 6 carries a coil or coil winding 7 as part of the stator winding. Each two successive coils 7 are continuously connected and form a coil pair with the coils 7 in series connection. The coil pairs can each be contacted via two coil ends 8, 9. The total of twelve illustrated coil ends 8, 9, specifically six first coil ends 8 and six second coil ends 9, are oriented or organized in the direction of the motor axis A (i.e. axially) for further contact by a connection element 10 described in greater detail hereinafter.

Figure 3:
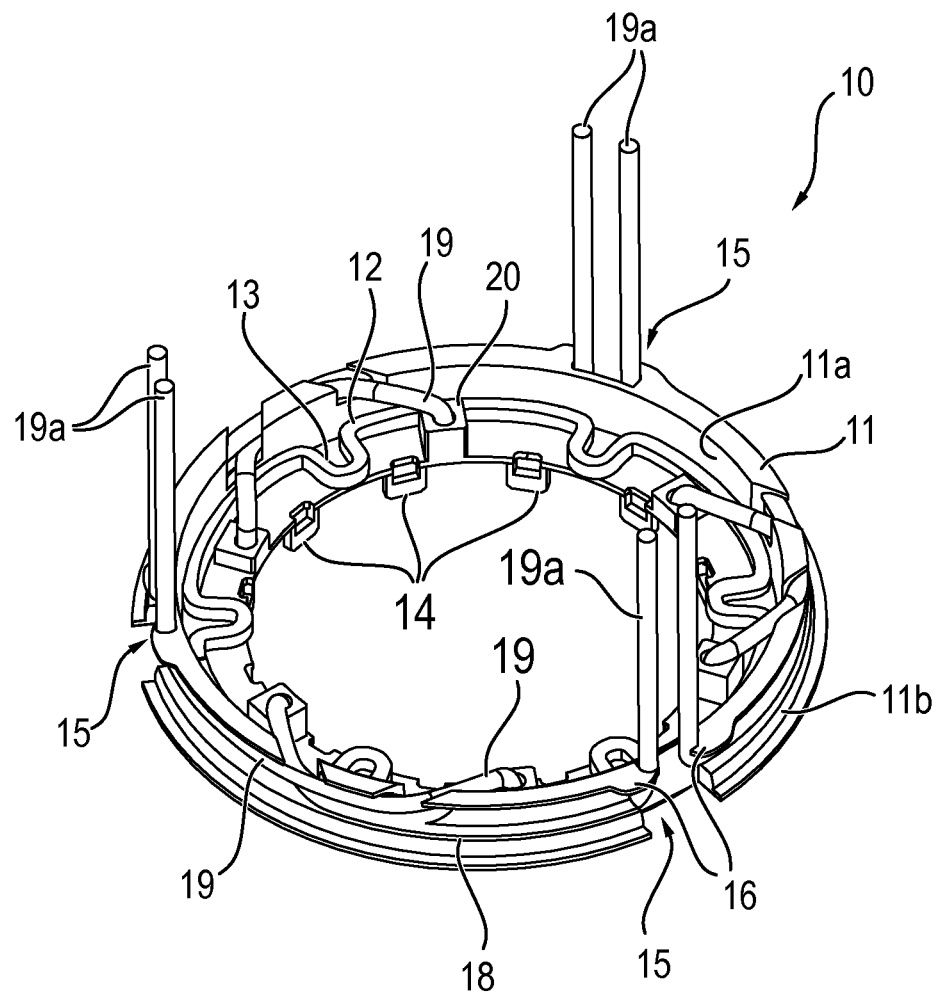
FIG. 3 shows a perspective illustration of a connection element with wiring and with a contact ring.

FIG. 3 shows the preferred embodiment of the connection element 10, which serves to contact and connect the coil ends 8, 9 and is ring-shaped for this purpose. The connection element 10 comprises an annular frame part 11 with a radial inner collar 11a and with a circumferential wall 11b.

An annularly bent contact ring 12 lies in the frame part 11 and here expediently bears against the inner circumference thereof. The contact ring 12 is locally bent out specially at exposed positions so as to form there U-shaped or semi-circular contact points or loops 13, which extend radially within the connection element 10. Axially oriented detent elements 14 distributed over the inner circumference of the annular connection element 10 are formed integrally on the frame part 11.

Furthermore, groove-like or notch-like recesses 15 are formed in the circumferential wall 11*b* of the frame part 11 and are open suitably on the outer circumferential side for simple handling during assembly. Pawl-, pin-, or hook aperture-like retaining elements 16 are formed integrally on the circumferential wall 11*b* of the frame part 11 on each side of the respective recess 15. The recesses 15 form exposed points, as will be described in greater detail hereinafter.

Figure 6:
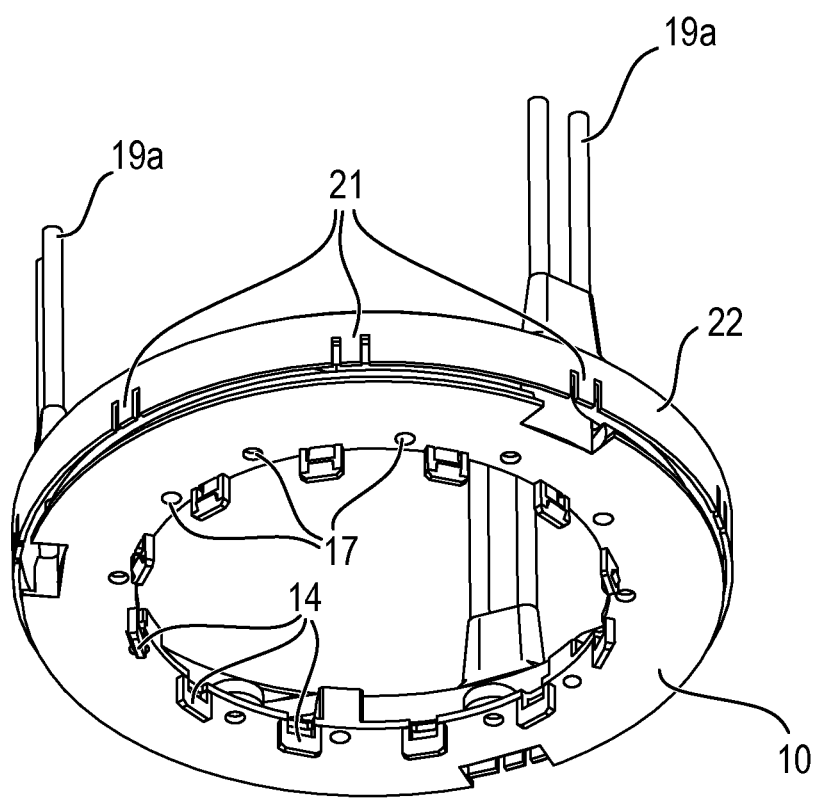
FIG. 6 shows a perspective illustration of the connection element with cover element fitted on, in a second view.

As can be clearly seen by way of comparison from FIG. 6, base-side contact vias 17 for passing through and/or contacting the coil ends 8 and 9 sticking up axially in accordance with FIG. 2 are formed in the frame collar 11*a* of the frame part 11 and thus in the connection element 10. The contact vias or openings 17 are distributed over the circumference, wherein the distribution pattern thereof is adapted to the respective circumferential positions of the coil ends 8 and 9 according to FIG. 2. The stator-side circumferential positions of the coil ends 8 and 9 may also be adapted to the corresponding feedthrough positions of the contact vias 17 of the connection element 10.

In addition, grooves 18 open in the circumferential wall 11*b* of the frame part 11 on the outer circumferential side are provided along the outer circumference of said frame part 11 and may also be produced by the forming of accordingly extending wall webs in the circumferential wall 11*b*. These azimuthally extending grooves 18 (azimuthal grooves) of the connection element 10 lead into the recesses 15 from each side thereof and therefore lead into the exposed points.

The connection element 10 receives the coil ends 8, 9 shown in FIG. 2 in order to contact and to connect these. As can be seen from FIGS. 2 and 6 in conjunction by way of example with FIGS. 1, 4 and 7, the coil ends 8 and 9 penetrate into the contact openings 17 when the connection ring 10 shown from beneath in FIG. 6 is joined to the wound stator 2 shown in FIG. 2.

In accordance with the preferred exemplary embodiment the first coil ends 8 penetrate here into each second contact opening 17, whereas the second coil ends 8 penetrate into the contact openings 17 arranged therebetween. The contact openings 17 assigned to the first coil ends 8 here form a first contacting group, whereas the contact openings 17 associated with the second coil ends 9 form a second contacting group, of which the contact openings 17 are aligned with the specially shaped or bent-out contact points 13 of the contact ring 12. There, the first coil ends 8 are contacted by clamping in the joining position at the contact points 13, in particular on account of the loop-shaped embodiment thereof, and are connected by means of the contact ring 12, preferably to form a neutral point of the stator winding.

The second coil ends 9 are guided within the connection element 10 through the corresponding contact openings 17 and then azimuthally along the outer circumference of the frame part 11. Alternatively, the second coil ends 9 in the corresponding contact openings 17 can be contacted with separate conductor elements in the form of wire pieces or the like.

These contact openings 17 of the connection element 10 form a second contacting group. An improved guidance and/or holding of the second coil ends 9 is advantageously achieved in that the contact openings 17 of the second contacting group have a comparatively long guide channel, which is produced by dome-like contact attachments 20 raised in the axial direction. These contact attachments 20 are provided on the side of the frame part 11 opposite the stator 2, on the inner collar 11*a* of said frame part in the region of the contact openings 17 of the second contacting group, and are advantageously formed integrally thereon. In the variant with separate conductor elements the second coil ends 9 are contacted with the conductor elements within these contact attachments or channels 20.

Whereas for the first coil ends 8 clamping contacts so to speak are thus provided via the contact openings 17 of the first contacting group in conjunction with the contact ring 12 and in particular contact points 13 thereof by means of the connection element 10, the connection element 10 for the second coil ends 9 forms plug contacts so to speak via the contact openings 17 of the second contacting group and in particular by means of the contact attachments 20, when separate conductor elements are provided.

Figure 4:
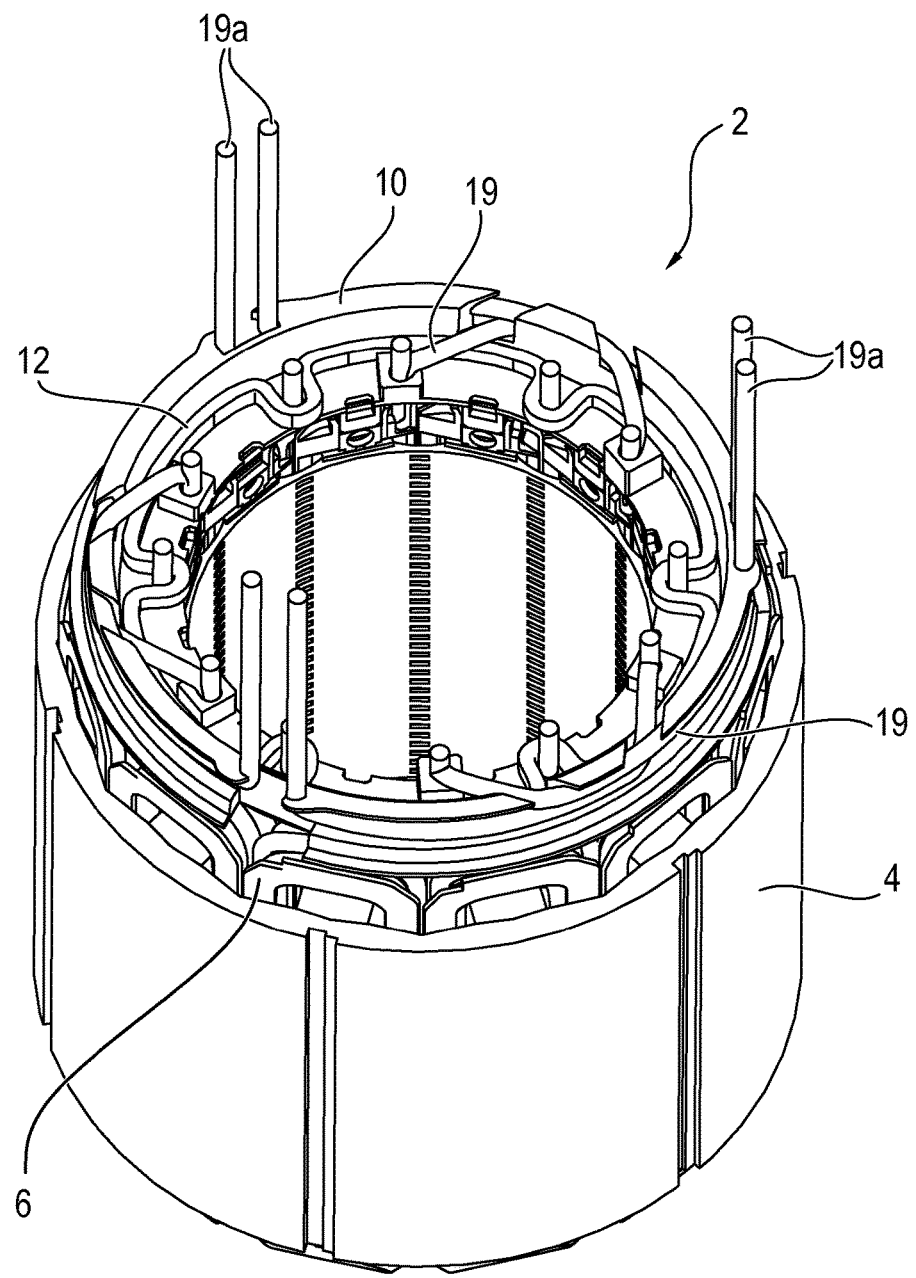
FIG. 4 shows a perspective illustration of an assembled stator formed from stator laminated core, winding frame, coil windings and connection element, and also having a stator yoke.

As can be clearly seen by way of comparison from FIGS. 3 and 4, the second coil ends 9 each have a coil end portion 19, in which azimuthal grooves 18 are guided and laid therein. In the embodiment with separate conductor elements, these are corresponding conductor portions. Connection ends 19*a* of the coil ends 9 or of the conductor elements adjoining these portions 19 are bent in the recesses 15 of the connection element 10 at the aperture-like retaining elements 16, such that these connection ends 19*a* extend in the axial direction A at the exposed points formed by the recesses 15 and form three-phase winding connections.

The coil ends 9, i.e. the winding connections 19*a* at the coil end portions 19 thereof or at the conductor portions of the additional conductor elements, are oriented in pairs in the three recesses or exposed points 15 provided in the present case. On the whole, a three-phase connection configuration is thus formed, consisting of connections 19*a* contacted and connected with in each case two second coil ends 9, said connections being intended to provide three-phase power to the stator winding.

In the exemplary embodiment twelve stator teeth 5 are provided, each having a winding carrier 6 and at least one coil 7 thereon, with a total of twelve coil ends 8, 9. The connection element 10 makes it possible to provide a three-phase connection wiring of the electric motor 1 with simple assembly and in particular simple wiring.

The connection element 10 additionally provides a particularly suitable, easily handled and in particular space-saving guidance of the second coil ends 9 in the azimuthal grooves 18 along the outer circumference of the frame part 11. The retaining elements 16 on the outer circumference of the enclosing wall 11*b* of the frame part 11 here allow a sufficiently secure fixing and positioning of the connections 19 of the second coil ends 9.

The detent elements 14 preferably formed integrally on the connection element 10 enable simple and reliable latching between the connection element 10 and the stator 2 as these two joining parts 2, 10 are joined during the course of assembly. The detent elements 14 of the connection element 10 here engage with corresponding detent elements 21 in the form of detent loops, which are formed integrally on the winding carriers 6 of the coils 7 and extend in the axial direction A. Since on the one hand the stator teeth 5 extend in the radial direction R (FIG. 1) and the winding carriers 6 are fitted hereon, and since on the other hand the winding carrier-side detent elements 21 extend in the axial direction A, it is ensured that the connection element 10 is held reliably on the stator 2.

Figure 5:
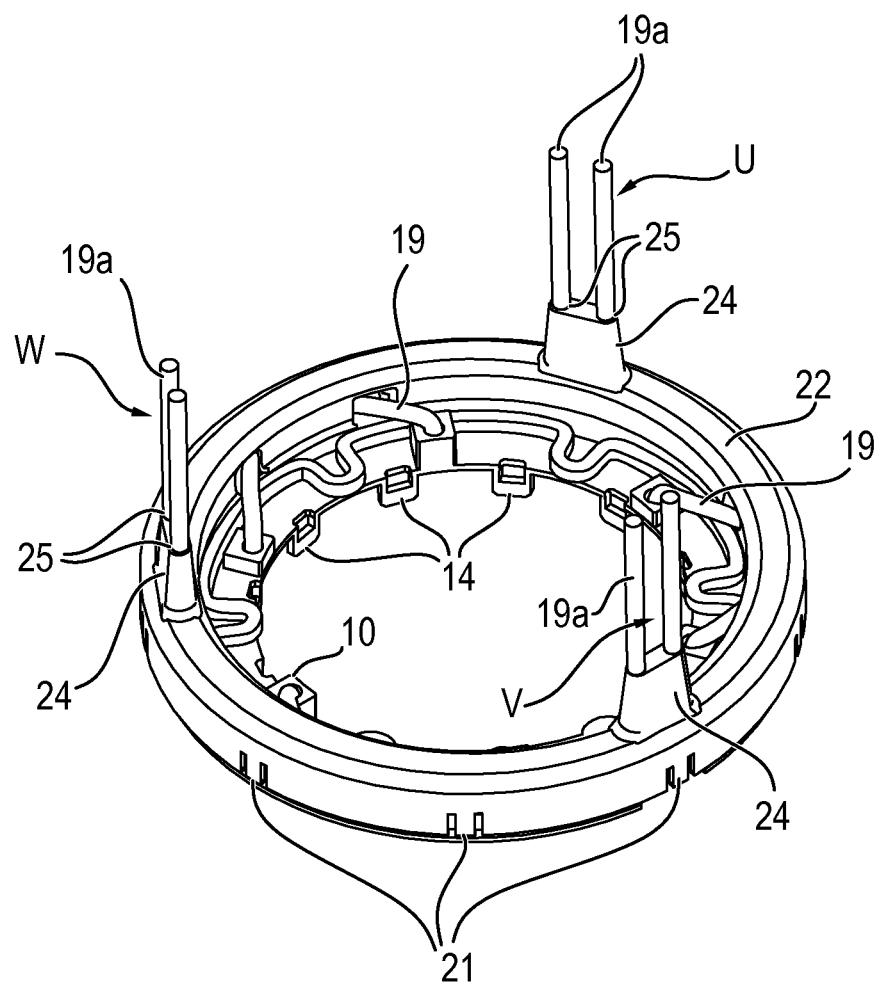
FIG. 5 shows a perspective illustration of the connection element with cover element fitted on, in a first view.

As can be seen in particular from FIGS. 5 and 6, the connection element 10 has a cover element 22. This is preferably likewise ring-shaped and is adapted to the contour of the frame element 11 and in particular to the circumferential wall 11b thereof in order to cover this and in particular to cover or to close the azimuthal grooves 18 in a manner protected to the greatest possible extent against dust and soiling. The cover element 22 is preferably latched to the frame part 11 in order to reliably join these two parts 10, 22 to one another. For this purpose, a number of detent elements 23 are formed integrally on the hood-like cover element 22 on the outer circumferential side and cooperate with corresponding detent contours of the frame part 11 to produce the latched connection.

Dome-like guide sleeves raised in the axial direction A are formed integrally on the cover element 22 as guide elements 24 for the connections 19a of the second coil ends 9. The guide sleeves 24 are aligned with the recesses 15 in the frame part 11 of the connection element 10, said recesses forming the exposed points. On the head side, opening pairs 25 are formed in the guide sleeves 24, via which the connections 19a of the coil ends 9 serving as three-phase winding connections are guided out and are thus stabilized in an accurately positioned manner.

Figure 7:
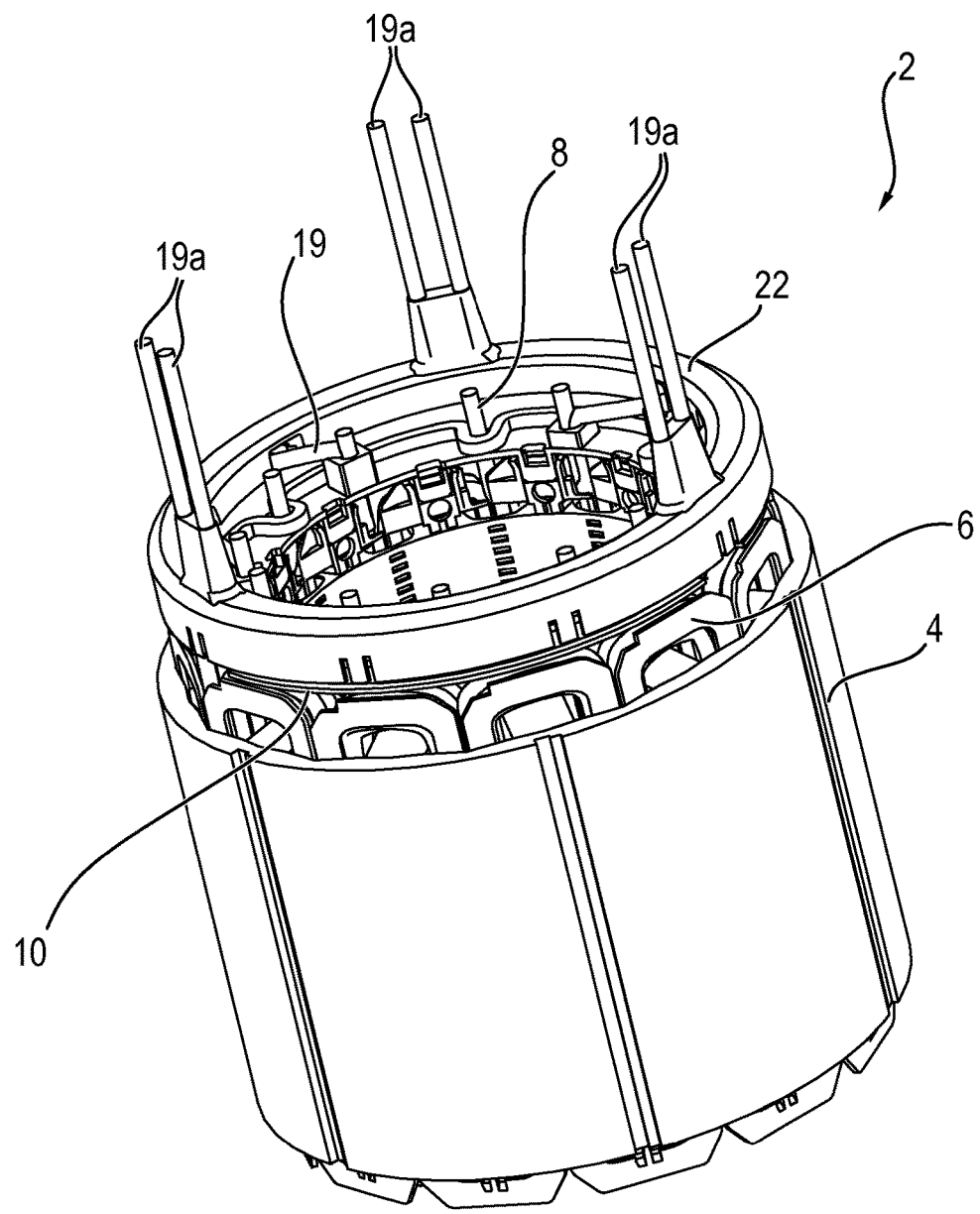
FIG. 7 shows a perspective illustration of the assembled stator with stator laminated core, winding frame, coil windings and contact and connection element, and stator yoke inclusive of the cover element of the connection element.

FIG. 7 shows the stator 2 with assembled connection element 10 inclusive of the cover element 22 thereof. As can be seen, the connections 19a contacted with the second coil ends 9 by means of the connection element 10 protrude out from the connection element 10 in the axial direction A via the corresponding end face of the stator 2 in an exactly positioned and securely held manner and form the winding connections of the stator winding for connection to a control electronics unit for supplying three-phase power to the electric motor 1. As can be seen, the stator 2 is surrounded by the stator yoke 4, which is reliably contacted with the free ends of the stator teeth 5, for example by staking.

The invention is not limited to the above-described exemplary embodiments. Rather, other variants of the invention can also be derived herefrom by a person skilled in the art without departing from the subject matter of the invention. In particular, all individual features described in conjunction with the exemplary embodiments can also be combined differently with one another without departing from the subject matter of the invention.

LIST OF REFERENCE SIGNS 1 electric motor
2 stator
3 rotor
4 yoke
5 stator tooth
6 winding carrier
7 coil/coil winding
8 first coil ends
9 second coil ends
10 connection element
11 frame part
11a inner collar
11b circumferential wall
12 contact ring
13 contact point
14 detent elements
15 recess/exposed point
16 retaining elements
17 contact opening
18 azimuthal groove
19 coil ends/conductor portion
19a connection ends/winding connection
20 attachment
21 detent element
22 cover element
23 detent element
24 guide element/sleeve
25 opening pair
A axial direction
R radial direction

The invention claimed is:

1. An electric motor, comprising:
a rotor;
a stator having a three-phase stator winding with at least one coil per phase, said at least one coil per phase each having first and second coil ends;
a connection element having a plurality of contact vias corresponding to a number of said coil ends, said vias forming first and second contacting groups;
a contact ring having contact points being associated with said contact vias of said first contacting group for providing an electrically conductive connection of said first coil ends;
said second coil ends being guided through said contact vias of said second contacting group and having coil end portions azimuthally guided along said connection element and guided out from said connection element to provide three-phase winding connections at exposed positions; and
said connection element having a plurality of detent elements; and
stator-side winding frames associated with said coils have detent elements corresponding to said detent elements of said connection element for producing a latched connection to said connection element.

2. The electric motor according to claim 1, wherein said electrically conductive connection of said first coil ends forms a neutral point.

3. The electric motor according to claim 1, wherein said coil end portions are axially guided out from said connection element.

4. The electric motor according to claim 1, wherein said coil end portions of said second coil ends are formed as separate conductor elements being contacted within said connection element with said second coil ends and forming said winding connections.

5. The electric motor according to claim 1, wherein said connection element includes a ring-shaped frame part in which said contact ring is laid.

6. The electric motor according to claim 5, wherein said frame part has a circumferential wall and a radial inner collar formed integrally on said circumferential wall, said contact vias are provided in said frame collar and said circumferential wall has azimuthal grooves.

7. The electric motor according to claim 6, wherein said contact vias extend axially in said frame collar and said azimuthal grooves are formed on an outer circumferential side of said circumferential wall.

8. The electric motor according to claim 1, wherein said contact points of said contact ring are bent out in a loop-shape aligned with said contact vias of said first contacting group to receive and contact said first coil ends.

9. The electric motor according to claim 1, wherein said connection element has retaining elements holding said winding connections at said exposed positions.

10. The electric motor according to claim 9, wherein said winding connections are held axially by said retaining elements.

11. The electric motor according to claim 1, which further comprises a cover element configured to be fixed to said connection element.

12. The electric motor according to claim 11, wherein said cover element is configured to be latched to said connection element.

13. The electric motor according to claim 11, wherein said cover element has a plurality of guide elements for said winding connections corresponding to a number of said phases.

14. The electric motor according to claim 13, wherein said guide elements are raised in a dome-shape.

15. The electric motor according to claim 13, wherein said winding connections are guided axially out from said connection element through said guide elements of said cover element.

16. The electric motor according to claim 15, wherein said winding connections are configured for contact with a control electronics unit.

17. The electric motor according to claim 1, wherein said connection element contacts said first coil ends with said vias of said first contacting group by clamping.

18. An electric motor, comprising:
a rotor;
a stator having a three-phase stator winding with at least one coil per phase, said at least one coil per phase each having first and second coil ends;
a connection element having a plurality of contact vias corresponding to a number of said coil ends, said vias forming first and second contacting groups;
a contact ring having contact points being associated with said contact vias of said first contacting group for providing an electrically conductive connection of said first coil ends;
a cover element configured to be fixed to said connection element;
said second coil ends being guided through said contact vias of said second contacting group and having coil end portions azimuthally guided along said connection element and guided out from said connection element to provide three-phase winding connections at exposed positions
said cover element having a plurality of guide elements for said winding connections corresponding to a number of said phases.

* * * * *